(12) United States Patent
Xiang et al.

(10) Patent No.: US 12,423,105 B2
(45) Date of Patent: Sep. 23, 2025

(54) MULTI-CHANNEL PULSE MODULATION CONTROL SYSTEM, DEVICE, AND METHOD BASED ON RISC-V CUSTOM INSTRUCTIONS

(71) Applicant: SHENZHEN POWER SUPPLY CO., LTD., Guangdong (CN)

(72) Inventors: Zhen Xiang, Guangdong (CN); Qishen Lv, Guangdong (CN); Yan Li, Guangdong (CN); Xin Zhang, Guangdong (CN); Ying Yu, Guangdong (CN)

(73) Assignee: SHENZHEN POWER SUPPLY CO., LTD., Shenzhen (CN)

( * ) Notice: Subject to any disclaimer, the term of this patent is extended or adjusted under 35 U.S.C. 154(b) by 92 days.

(21) Appl. No.: 18/544,453

(22) Filed: Dec. 19, 2023

(65) Prior Publication Data

US 2024/0118893 A1  Apr. 11, 2024

Related U.S. Application Data

(63) Continuation of application No. PCT/CN2021/121672, filed on Sep. 29, 2021.

(30) Foreign Application Priority Data

Jul. 15, 2021 (CN) .......................... 202110799813.1

(51) Int. Cl.
*G06F 9/30* (2018.01)
*G06F 9/32* (2018.01)
(Continued)

(52) U.S. Cl.
CPC .......... *G06F 9/30181* (2013.01); *G06F 9/321* (2013.01); *G06F 13/4282* (2013.01)

(58) Field of Classification Search
CPC .. G06F 9/30181; G06F 9/321; G06F 13/4282; G06F 9/30076; H03K 7/08
See application file for complete search history.

(56) References Cited

U.S. PATENT DOCUMENTS

| 2006/0097685 A1* | 5/2006 | Shin ......................... H03K 7/06 |
| | | 318/696 |
| 2014/0266082 A1* | 9/2014 | Ye ............................. G05F 1/67 |
| | | 323/205 |

(Continued)

FOREIGN PATENT DOCUMENTS

| CN | 110968972 A | 4/2020 |
| CN | 111400986 A | 7/2020 |
| CN | 112199322 A | 1/2021 |

OTHER PUBLICATIONS

Ishimaru, Pedro JA, et al. "An FPGA-Based RFID Baseband Processor Using a RISC-V Platform." 2018 31st Symposium on Integrated Circuits and Systems Design (SBCCI), [retrieved on May 20, 2025]. Retrieved from the Internet <URL: https://ieeexplore.ieee.org/abstract/document/8533242 >.*

(Continued)

*Primary Examiner* — Shawn Doman (57) ABSTRACT

This application relates to a pulse modulation control system, device, and method. The system includes a processor based on a RISC-V open-source instruction set architecture and a pulse modulation interface module. The processor is configured to receive an operation instruction of a user, and generate a data signal based on the operation instruction. The pulse modulation interface module is connected to the processor, and is configured to receive the data signal and output a preset waveform based on the data signal. Based on the RISC-V open-source instruction set architecture, the (Continued)

user may customize operations, which improves efficiency and flexibility of a pulse modulation process, and optimizes power consumption.

7 Claims, 4 Drawing Sheets

(51) Int. Cl.
*G06F 13/42* (2006.01)
*H03K 7/08* (2006.01)

(56) References Cited

U.S. PATENT DOCUMENTS

| | | | |
|---|---|---|---|
| 2016/0345093 A1* | 11/2016 | Taffler | H03K 7/08 |
| 2019/0272119 A1* | 9/2019 | Brewer | G06F 3/0604 |
| 2021/0127206 A1* | 4/2021 | Katayama | G06F 3/16 |
| 2022/0070058 A1* | 3/2022 | Lee | H04L 41/0806 |
| 2022/0080458 A1* | 3/2022 | Palit | G01H 11/08 |
| 2022/0206548 A1* | 6/2022 | Sung | H05K 7/20209 |

OTHER PUBLICATIONS

Höller, Roland, et al. "Open-source risc-v processor ip cores for fpgas—overview and evaluation." 2019 8th Mediterranean Conference on Embedded Computing (MECO), [retrieved on May 20, 2025]. Retrieved from the Internet <URL: https://ieeexplore.ieee.org/abstract/document/8760205>.*

International Search Report of PCT Patent Application No. PCT/CN2021/121672 issued on Apr. 25, 2022.

* cited by examiner

MULTI-CHANNEL PULSE MODULATION CONTROL SYSTEM, DEVICE, AND METHOD BASED ON RISC-V CUSTOM INSTRUCTIONS

CROSS-REFERENCE TO RELATED APPLICATIONS

This application is a Continuation Application of PCT Application No. PCT/CN2021/121672 filed on Sep. 29, 2021, which claims priority to Chinese Patent Application No. 202110799813.1, filed with the China National Intellectual Property Administration on Jul. 15, 2021, entitled "PULSE MODULATION CONTROL SYSTEM, DEVICE, AND METHOD", which is incorporated by reference herein in its entirety.

TECHNICAL FIELD

This application relates to the field of pulse modulation, and in particular, to a pulse modulation control system, device, and method.

BACKGROUND

Pulse width modulation (PWM) is an efficient technology that controls an analog circuit by using a digital output of a microprocessor, and is widely used in many fields such as measurement, communication, and power control and transformation.

However, a conventional PWM control system usually uses microprocessors with architectures x86 and ARM. The two architectures are universal, and have no instructions specially used for PWM. Therefore, control efficiency is low, and a plurality of instructions are usually required to complete a PWM output operation.

Moreover, as commercial architectures, x86 and ARM need to retain many outdated definitions to maintain backward compatibility during use and development, resulting in a large number of instructions and severe instruction redundancy. If the architectures are used to design new processors, a relatively large area and relatively large power consumption are inevitably caused. In addition, using the commercial architectures incurs high patent licensing fees.

SUMMARY

Based on the above, a pulse modulation control system, device, and method need to be provided to resolve the above problem in the background. Based on a RISC-V open-source instruction set architecture, a user may customize operations, which improves efficiency and flexibility of a pulse modulation process, and optimizes power consumption.

An aspect of this application provides a pulse modulation control system, including a processor based on a RISC-V open-source instruction set architecture and a pulse modulation interface module. The processor is configured to receive an operation instruction of a user, and generate a data signal based on the operation instruction. The pulse modulation interface module is connected to the processor, and is configured to receive the data signal and output a preset waveform based on the data signal.

In the pulse modulation control system in the above embodiment, the processor based on the RISC-V open-source instruction set architecture is arranged, to receive the operation instruction of the user, and generate the data signal based on the operation instruction, thereby controlling the pulse modulation interface module to output the preset waveform. Based on the RISC-V open-source instruction set architecture, the user may customize operations, which improves efficiency and flexibility of a pulse modulation process, and optimizes power consumption.

In an embodiment, the processor includes a basic instruction submodule and an extended instruction submodule. The basic instruction submodule is configured to implement a standard instruction set defined in a RISC-V standard. The extended instruction submodule is configured to implement a customized instruction set defined by the user.

In an embodiment, the customized instruction includes a pulse modulation control instruction used for generating a parameter data signal for controlling a pulse modulation parameter.

In an embodiment, the pulse modulation interface module includes sixteen pulse modulation channels, and any of the pulse modulation channels includes a register group, a counter and a direction controller. The register group is connected to the processor, and is configured to receive and store the parameter data signal. The counter is connected to the register group, and is configured to obtain a start signal and the data signal, start counting based on the start signal and the data signal, and generate a stage signal. The direction controller is connected to both the register group and the counter, and is configured to obtain the data signal and the stage signal, and output the preset waveform based on the data signal and the stage signal.

In an embodiment, the parameter data signal includes a first parameter data signal, a second parameter data signal, a third parameter data signal, and a fourth parameter data signal. The register group includes a pulse waveform control bit, a start phase control bit, a duty cycle control bit, and a waveform period control bit. The pulse waveform control bit occupies one bit, and is configured to store the first parameter data signal. The start phase control bit occupies one byte, and is configured to store the second parameter data signal. The duty cycle control bit occupies one byte, and is configured to store the third parameter data signal. The waveform period control bit occupies two bytes, and is configured to store the fourth parameter data signal.

The stage signal includes a trigger signal, a first stage control signal, and a second stage control signal. The counter includes a first counter, a second counter, and a third counter. The first counter is connected to both the start phase control bit and the direction controller, and is configured to obtain the start signal and a value of the second parameter data signal, start counting based on the start signal and the value of the second parameter data signal, and generate the trigger signal and the first stage control signal. The second counter is connected to the duty cycle control bit and the first counter, and is configured to obtain the trigger signal and a value of the third parameter data signal, start counting based on the trigger signal and the value of the third parameter data signal, and output the second stage control signal. The third counter is connected to the pulse waveform control bit, and is configured to obtain a value of the first parameter data signal, start timing based on the value of the first parameter data signal, and control the pulse modulation control system to stop.

In an embodiment, the preset waveform includes a convex waveform and a concave waveform, and the direction controller is configured to:

obtain the first parameter data signal and the first stage control signal, and generate the convex waveform or the concave waveform based on the first parameter data signal and the first stage control signal; and obtain the first parameter data signal and the second stage control signal, and generate the concave waveform or the convex waveform based on the first parameter data signal and the second stage control signal.

In an embodiment, the pulse modulation control system further includes an interface controller and a first interface module. The interface controller is connected to the basic instruction submodule, and is configured to execute the standard instruction set. The first interface module is connected to the interface controller, and is configured to implement data transmission and control of an external device.

In an embodiment, the first interface module includes at least one of a UART interface, a QSPI interface, an I2S interface, an I2C interface, a GPIO interface, and a JTAG interface.

Another aspect of this application provides a pulse modulation control device, including the pulse modulation control system in any embodiment of this application.

In the pulse modulation control device in the above embodiment, the processor based on the RISC-V open-source instruction set architecture is arranged, to receive the operation instruction of the user, and generate the data signal based on the operation instruction, thereby controlling the pulse modulation interface module to output the preset waveform. Based on the RISC-V open-source instruction set architecture, the user may customize operations, which improves efficiency and flexibility of a pulse modulation process, and optimizes power consumption.

Still another aspect of this application provides a pulse modulation control method, including the following steps:
  obtaining an operation instruction of a user;
  generating, by a processor based on a RISC-V open-source instruction set architecture, a data signal based on the operation instruction; and
  receiving the data signal and outputting a preset waveform based on the data signal through a pulse modulation interface module.

According to the pulse modulation control method of this application, a set of instructions specially used for PWM control is designed based on the characteristic that instruction sets can be customized in RISC-V cores. Generation of a PWM waveform can be implemented using a single instruction. Compared with conventional architectures x86 and ARM, the multi-instruction operation has much higher efficiency, and a controller with the RISC-V architecture is more lightweight and consumes less power.

BRIEF DESCRIPTION OF THE DRAWINGS

To describe the technical solutions of embodiments of this application more clearly, the following briefly introduces drawings required for describing the embodiments. Apparently, the drawings in the following description show only some embodiments of this application, and a person of ordinary skill in the art may derive drawings of other embodiments from these drawings without creative efforts.

DETAILED DESCRIPTION

For ease of understanding this application, a more comprehensive description of this application is provided below with reference to relevant drawings. Preferred embodiments of this application are shown in the drawings. However, this application may be implemented in many different forms, and is not limited to the embodiments described herein. On the contrary, these embodiments are provided to enable a more thorough and comprehensive understanding of the disclosed content of this application.

Unless otherwise defined, meanings of all technical and scientific terms used herein are the same as those usually understood by a person skilled in the art to which this application belongs. In this application, terms used in the specification of this application are merely intended to describe objectives of the specific embodiments, and are not intended to limit this application. A term "and/or" used herein includes any or all combinations of one or more related listed items.

Unless clear definitive terms such as "only" and "consist of . . . " are used, another component may still be added even though terms "include", "have", and "including" are used herein. Unless mentioned to the contrary, a singular term may include a plural form and cannot be understood as a quantity of one.

It should be understood that although the terms "first", "second", and the like may be used herein to describe various elements, these elements should not be limited by these terms. These terms are merely used for distinguishing one element from another. For example, without departing from the scope of this application, a first element may be referred to as a second element, and similarly, the second element may be referred to as the first element.

In this application, unless otherwise explicitly specified and defined, terms "connect", "connection", and the like should be understood in a broad sense. For example, the connection may be a direct connection, an indirect connection through an intermediary, internal communication between two elements, or an interaction relationship between two elements. A person of ordinary skill in the art may understand specific meanings of the above terms in this application according to specific situations.

In the field of processors, x86 and ARM are current mainstream architectures. After decades of development, hundreds and thousands of pages of modern architecture documents exist for the architectures x86 and ARM, which include numerous versions. One of main reasons is that a modern processor architecture technology also continuously becomes mature during the development of the architectures. As commercial architectures, x86 and ARM need to retain many outdated definitions to maintain backward compatibility of the architectures, or to be compatible with existing technical parts when new architecture parts are defined. Over time, the architectures become extremely verbose. However, as an instruction set, RISC-V may be freely used for any purpose compared with most instruction sets, allowing anyone to design, manufacture, and sell RISC-V chips and software. The RISC-V achieves balance between a data transmission amount and a transmission speed, which is an excellent architecture in the heterogeneous IoT era. A series of ecosystems derived from RISC-V are becoming perfect. The RISC-V further has the following advantages: The RISC-V has an open source, and has low CPU design costs, and can achieve huge economic benefits through any collaboratively generated hardware innovation. The RISC-V is simple, and has only over 40 basic instruction sets, but meets high requirements of an embedded scenario and the IoT on the code size. The RISC-V is flexible, and has a large amount of reserved encoding space and 4 user instructions reserved therein, which may be used for extending an instruction set. Although the RISC-V is not the first open-source instruction set, it is of great significance because its design adapts to modern computing devices. The designer considered performance and power efficiency in these applications. The instruction set is supported by numerous software, which resolves a common weakness of new instruction sets.

Figure 1:
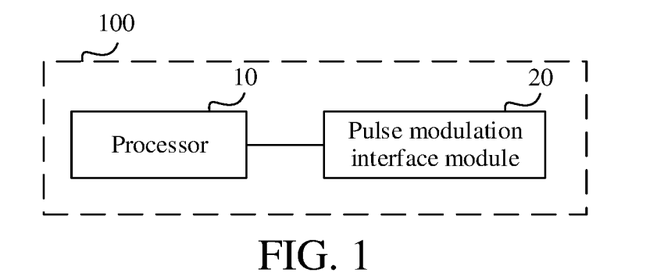
FIG. 1 is a schematic structural diagram of a pulse modulation control system according to a first embodiment of this application.

In an embodiment of this application, as shown in FIG. 1, a pulse modulation control system 100 is provided, including a processor 10 based on a RISC-V open-source instruction set architecture and a pulse modulation interface module 20. The processor 10 is configured to receive an operation instruction of a user, and generate a data signal based on the operation instruction. The pulse modulation interface module 20 is connected to the processor 10, and is configured to receive the data signal and output a preset waveform based on the data signal.

In the pulse modulation control system 100 in the above embodiment, the processor 10 based on the RISC-V open-source instruction set architecture is arranged, to receive the operation instruction of the user, and generate the data signal based on the operation instruction, thereby controlling the pulse modulation interface module 20 to output the preset waveform. Based on the RISC-V open-source instruction set architecture, the user may customize operations, which improves efficiency and flexibility of a pulse modulation process, and optimizes power consumption.

Figure 2:
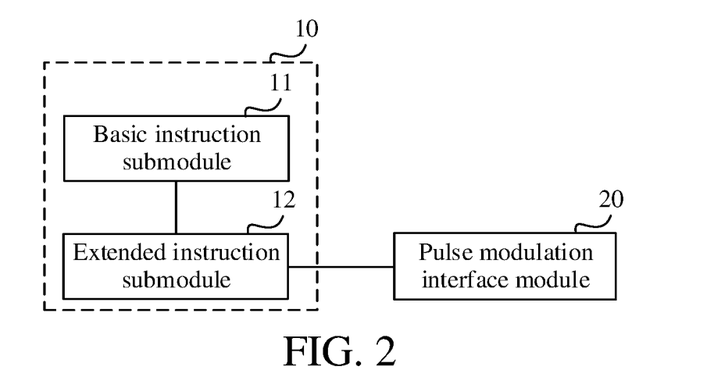
FIG. 2 is a schematic structural diagram of a pulse modulation control system according to a second embodiment of this application.

In an embodiment, as shown in FIG. 2, the processor 10 includes a basic instruction submodule 11 and an extended instruction submodule 12. The basic instruction submodule 11 is configured to implement a standard instruction set defined in a RISC-V standard. The extended instruction submodule 12 is configured to implement a customized instruction set defined by the user.

Specifically, the most significant difference between the RISC-V architecture and other mature commercial architectures lies in that the RISC-V architecture is a modular architecture. In this application, the CPU that complies with the RISC-V ISA standard includes the basic instruction submodule 11. The module is configured to implement the standard instruction set defined in the RISC-V standard. The standard instruction set includes RV32I, RV32E, RV64I, and RV128I. The RV32I is a 32-bit integer instruction set, and the RV32E is a subset of the RV32I used in a small embedded scenario. The RV64I is a 64-bit integer instruction set compatible with the RV32I, and the RV128I is a 128-bit integer instruction set compatible with the RV64I and the RV32I, The CPU that complies with the RISC-V ISA standard further includes the extended instruction submodule 12 configured to implement the customized instruction set defined by the user. The RISC-V architecture is short and robust, and allows different parts to be organized together in a modular manner, thereby meeting various different applications through a unified architecture. The modularization is absent in the architectures x86 and ARM. An open source of the RISC-V ISA means that corresponding chip architectures may be created for different application scenarios. Through corresponding customized instructions tool, applications may be accelerated more effectively. A heterogeneous multi-core characteristic also promotes power optimization.

In an embodiment, the customized instruction includes a pulse modulation control instruction used for generating a parameter data signal for controlling a pulse modulation parameter.

Specifically, based on the extended instruction set in the RISC-V open-source instruction set architecture, the user may customize instructions and apply the instructions in the pulse modulation technology. The user may specify the pulse modulation control instruction as required. The pulse modulation control instruction is used for generating the parameter data signal for controlling the pulse modulation parameter. The pulse modulation parameter includes a pulse length, a duty cycle, a start phase, a waveform, and the like.

Figure 3:
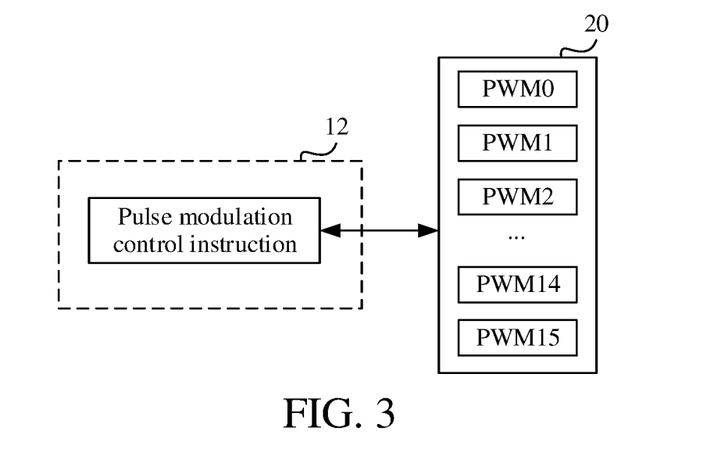
FIG. 3 is a schematic structural diagram of a pulse modulation control system according to a third embodiment of this application.
Figure 4:
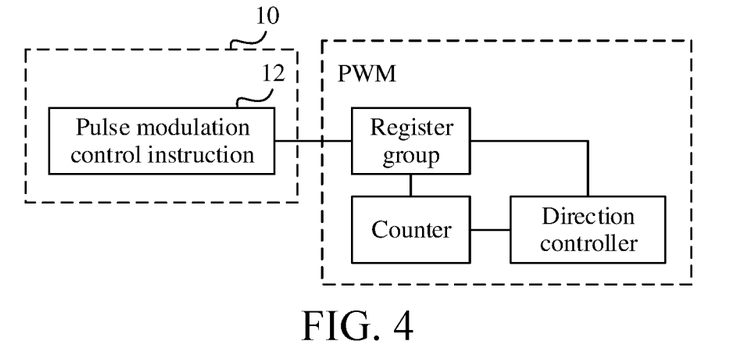
FIG. 4 is a schematic structural diagram of a pulse modulation channel according to a fourth embodiment of this application.

In an embodiment, as shown in FIG. 3 and FIG. 4, the pulse modulation interface module 20 includes sixteen pulse modulation channels, and any of the pulse modulation channels includes a register group, a counter and a direction controller. The register group is connected to the processor, and is configured to receive and store the parameter data signal. The counter is connected to the register group, and is configured to obtain a start signal and the data signal, start counting based on the start signal and the data signal, and generate a stage signal. The direction controller is connected to both the register group and the counter, and is configured to obtain the data signal and the stage signal, and output the preset waveform based on the data signal and the stage signal.

Specifically, the pulse modulation interface module 20 includes sixteen pulse modulation channels: PWM0, PWM1, PWM2, . . . , PWM15, and each PWM channel includes the register group, the counter, and the direction controller. The register group is connected to the processor, and is configured to receive the pulse modulation control instruction and store the parameter data signal. The counter and the direction controller process the parameter data signal and then output the preset waveform.

In an embodiment, the parameter data signal includes a first parameter data signal, a second parameter data signal, a third parameter data signal, and a fourth parameter data signal. The register group includes a pulse waveform control bit, a start phase control bit, a duty cycle control bit, and a waveform period control bit. The pulse waveform control bit occupies one bit, and is configured to store the first parameter data signal. The start phase control bit occupies one byte, and is configured to store the second parameter data signal. The duty cycle control bit occupies one byte, and is configured to store the third parameter data signal. The waveform period control bit occupies two bytes, and is configured to store the fourth parameter data signal.

The stage signal includes a trigger signal, a first stage control signal, and a second stage control signal. The counter includes a first counter, a second counter, and a third counter. The first counter is connected to both the start phase control bit and the direction controller, and is configured to obtain the start signal and a value of the second parameter data signal, start counting based on the start signal and the value of the second parameter data signal, and generate the trigger signal and the first stage control signal. The second counter is connected to the duty cycle control bit and the first counter, and is configured to obtain the trigger signal and a value of the third parameter data signal, start counting based on the trigger signal and the value of the third parameter data signal, and output the second stage control signal. The third counter is connected to the pulse waveform control bit, and is configured to obtain a value of the first parameter data signal, start timing based on the value of the first parameter data signal, and control the pulse modulation control system to stop.

Figure 5:
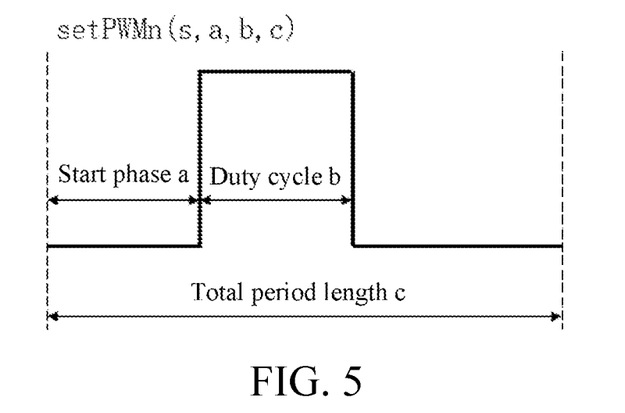
FIG. 5 is a schematic diagram of parameters of a pulse modulation control instruction according to a fifth embodiment of this application.

As an example, as shown in FIG. 5, a set of pulse modulation control instructions setPWMn(s,a,b,c) are defined by using the RISC-V customized instruction set, where s, a, b, and c are pulse modulation control instructions used for generating parameter data signals for controlling pulse modulation parameters, a corresponds to the first parameter data signal, and is used for controlling a start position of the preset waveform. b corresponds to the second parameter data signal, and is used for controlling a duty cycle of the preset waveform. c corresponds to the third parameter data signal, and is used for controlling a wavelength of the preset waveform. s corresponds to the fourth parameter data signal, and is used for controlling the preset waveform. Specifically, when s is 0, a convex waveform is generated, and when s is 1, a concave waveform is generated. Through setting of the instruction parameters s, a, b, and c, the preset waveform corresponding to the parameter data may be generated. The conventional architectures x86 and ARM implement pulse modulation through a plurality of instructions, which requires 5 to 10 instructions to complete the output of a pulse and takes up processor processes. The present invention uses the customized instruction and the PWM controller to complete generation of a pulse, which requires only one instruction without occupying processor process.

Figure 6:
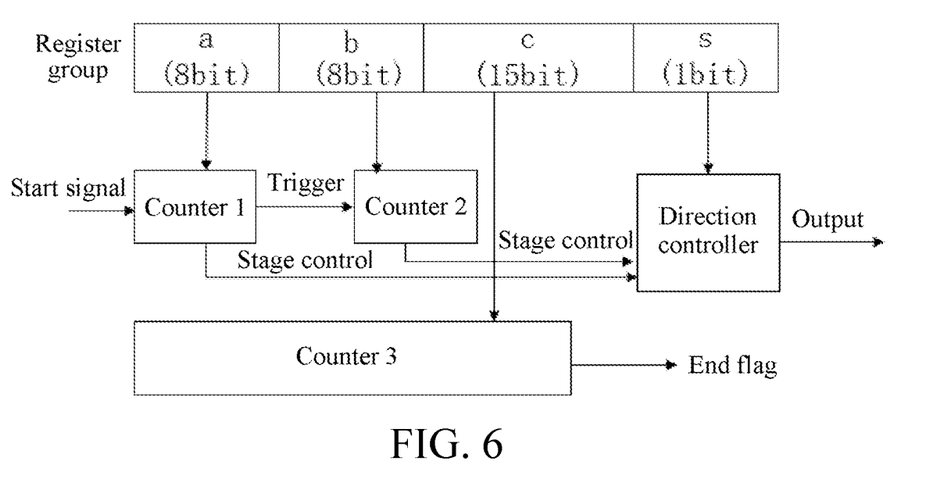
FIG. 6 is a schematic structural diagram of a pulse modulation channel according to a sixth embodiment of this application.

As an example, as shown in FIG. 6, the register group includes the pulse waveform control bit, the start phase control bit, the duty cycle control bit, and the waveform period control bit. The register is configured to store the parameter data signal. The pulse waveform control bit occupies one bit, and is configured to store the first parameter data signal a. The start phase control bit occupies one byte (eight bits), and is configured to store the second parameter data signal b. The duty cycle control bit occupies one byte (eight bits), and is configured to store the third parameter data signal c. The waveform period control bit occupies two bytes (sixteen bits), and is configured to store the fourth parameter data signal s. The counter includes a first counter, a second counter, and a third counter.

Specifically, after the user delivers an operation instruction setPWMn(s,a,b,c), the register group reads the data parameters a, b, c, and s, and transmits the parameters to the first counter, the second counter, the third counter, and the direction controller respectively. At the same time, the start signal is sent to the first counter. The first counter and the third counter start counting simultaneously. The first stage control signal is outputted in a counting stage of the first counter, to control the direction controller to output a logic level the same as s. To be specific, when s=0, 0 is outputted, and when s=1, 1 is outputted. After the first counter counts to a, the first counter ends the counting and outputs a trigger signal, and the second counter starts counting. The second stage control signal is outputted in a counting stage of the second counter, to control the direction controller to output a logic level opposite to s. To be specific, when s=0, 1 is outputted, and when s=1, 0 is outputted. The second counter stops counting after counting to b, and the direction controller outputs the logic level the same as s. The entire counting period ends when the third counter counts to c, and an end flag is outputted, which indicates completion of the operation instruction setPWMn(s,a,b,c), and the preset waveform is outputted.

In an embodiment, the preset waveform includes a convex waveform and a concave waveform, and the direction controller is configured to:
obtain the first parameter data signal and the first stage control signal, and generate the convex waveform or the concave waveform based on the first parameter data signal and the first stage control signal; and
obtain the first parameter data signal and the second stage control signal, and generate the concave waveform or the convex waveform based on the first parameter data signal and the second stage control signal.

Specifically, the direction controller controls a waveform of an outputted pulse based on the first parameter data signal and the stage control signal. The first parameter data signal s is stored in the pulse waveform control bit of the register group, and the stage signal is controlled to be sent by the counter. As an example, when the first parameter data signal s=0 and the direction controller obtains the first stage control signal, the direction controller outputs the convex waveform. When the first parameter data signal s=0 and the direction controller obtains the second stage control signal, the direction controller outputs the concave waveform. When the first parameter data signal s=1 and the direction controller obtains the first stage control signal, the direction controller outputs the concave waveform. When the first parameter data signal s=1 and the direction controller obtains the second stage control signal, the direction controller outputs the convex waveform. In this application, through setting of parameter instructions based on the RISC-V, pulse width modulation (PWM) control may be performed, which greatly simplifies the PWM control process and reduces costs.

Figure 7:
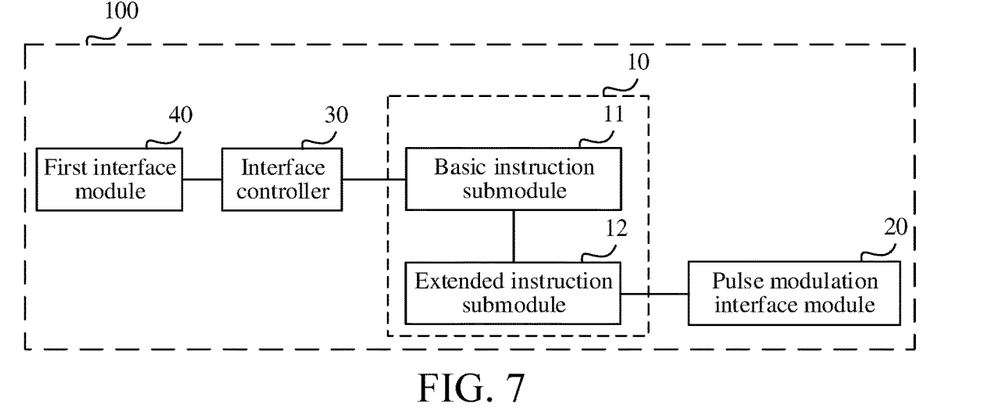
FIG. 7 is a schematic structural diagram of a pulse modulation control system according to a seventh embodiment of this application.

In an embodiment, as shown in FIG. 7, the pulse modulation control system 100 further includes an interface controller 30 and a first interface module 40. The interface controller 30 is connected to the basic instruction submodule 11, and is configured to execute the standard instruction set. The first interface module 40 is connected to the interface controller 30, and is configured to implement data transmission and control of an external device.

Specifically, the first interface module may be an interface commonly used for processors, and is configured to perform functions other than pulse modulation control. The interface controller may be an I/O controller.

Figure 8:
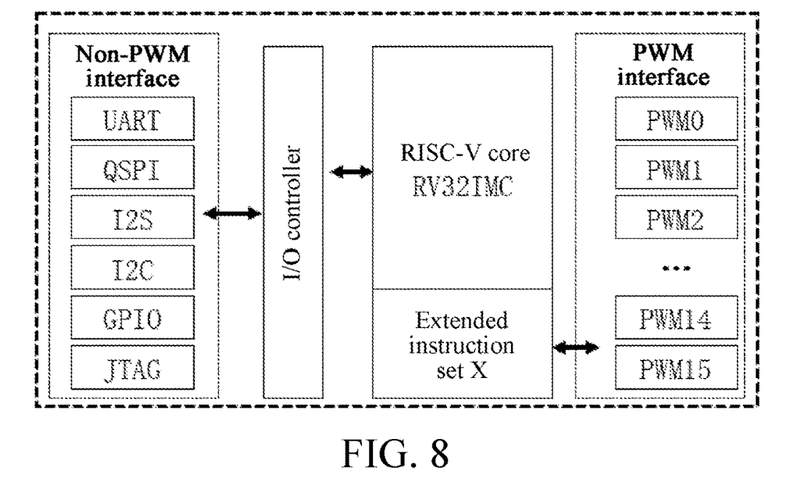
FIG. 8 is a schematic structural diagram of a pulse modulation control system according to an eighth embodiment of this application.

In an embodiment, as shown in FIG. 8, the first interface module includes at least one of a UART interface, a QSPI interface, an I2S interface, an I2C interface, a GPIO interface, and a JTAG interface.

Specifically, the UART is a universal asynchronous transceiver transmission interface, the QSPI is a six-wire serial peripheral interface, the I2S is an integrated circuit built-in audio bus, the I2C is a two-wire synchronous serial bus, the GPIO is a universal input/output interface, and the JTAG is a joint test bus. These interfaces are operated by regular instruction sets of RISC-V cores through an I/O controller. The PWM interface group is operated by the extended instruction set X in combination with a waveform generator.

Another aspect of this application provides a pulse modulation control device, including the pulse modulation control system in any embodiment of this application.

In the pulse modulation control device in the above embodiment, the processor based on the RISC-V open-source instruction set architecture is arranged, to receive the operation instruction of the user, and generate the data signal based on the operation instruction, thereby controlling the pulse modulation interface module to output the preset waveform. Based on the RISC-V open-source instruction set architecture, the user may customize operations, which improves efficiency and flexibility of a pulse modulation process, and optimizes power consumption.

Figure 9:
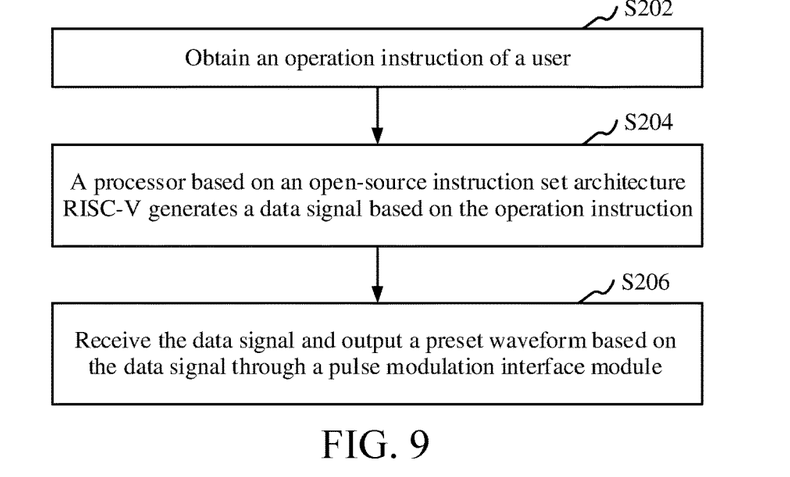
FIG. 9 is a schematic flowchart of a pulse modulation control method according to an embodiment of this application.

Still another aspect of this application provides a pulse modulation control method. As shown in FIG. 9, the method includes the following steps:

Step 202: Obtain an operation instruction of a user.

Step 204: A processor based on a RISC-V open-source instruction set architecture generates a data signal based on the operation instruction.

Step 206: Receive the data signal and output a preset waveform based on the data signal through a pulse modulation interface module.

According to the pulse modulation control method of this application, a set of instructions specially used for PWM control is designed based on the characteristic that instruction sets can be customized in the RISC-V cores. Generation of a PWM waveform can be implemented using a single instruction. Compared with conventional architectures x86 and ARM, the multi-instruction operation has higher efficiency, and a controller with the RISC-V architecture is more lightweight and consumes less power.

Figure 10:
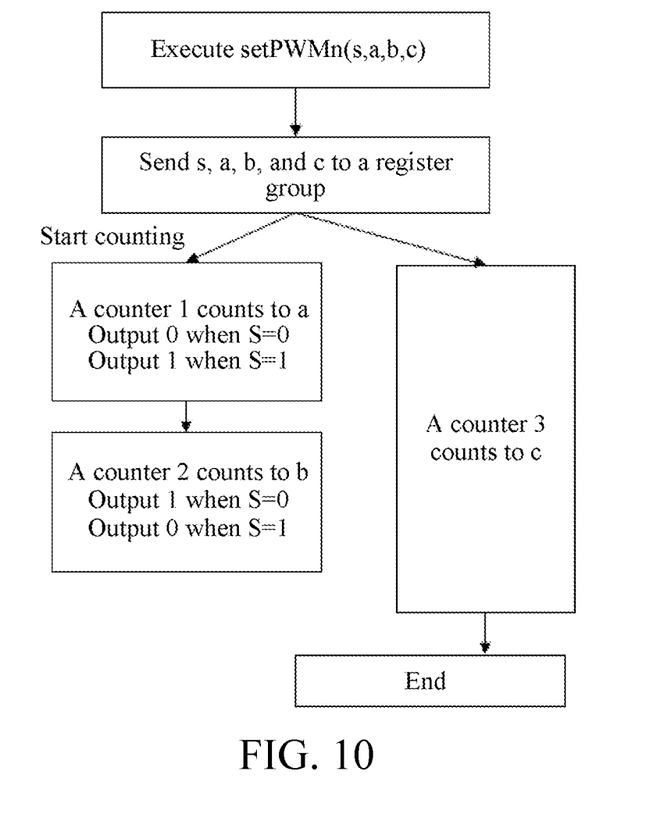
FIG. 10 is a schematic flowchart of a pulse modulation control method according to another embodiment of this application.

As an example, a set of instructions setPWMn(s,a,b,c) specially used for PWM control are designed based on the characteristic that instruction sets can be customized in the RISC-V cores, where s, a, b, and c are pulse modulation control instructions used for generating parameter data signals for controlling pulse modulation parameters. a corresponds to the first parameter data signal, and is used for controlling a start position of the preset waveform. b corresponds to the second parameter data signal, and is used for controlling a duty cycle of the preset waveform. c corresponds to the third parameter data signal, and is used for controlling a wavelength of the preset waveform. s corresponds to the fourth parameter data signal, and is used for controlling the preset waveform. Specifically, when s is 0, a convex waveform is generated, and when s is 1, a concave waveform is generated. Specifically, a process of controlling PWM generation by using the operation instruction is shown in FIG. 10. The controller executes the instruction setPWMn (s,a,b,c), and sends parameter data signals s, a, b, and c to the register group. The counter and the direction controller process the data signals and then output the preset waveform.

A person of ordinary skill in the art may understand that all or some of processes of the method in the above embodiments may be implemented by a computer program instructing relevant hardware. The program may be stored in a non-volatile computer-readable storage medium. When the program is executed, the processes of the above method embodiments may be implemented. References to the memory, the storage, the database, or other media used in the embodiments provided in this application may all include a non-volatile or a volatile memory. The non-volatile memory may include a read-only memory (ROM), a magnetic tape, a floppy disk, a flash memory, an optical memory, or the like. The volatile memory may include a random access memory (RAM) or an external cache. As a description rather than limitation, the RAM may have various forms, such as a static random access memory (SRAM), a dynamic random access memory (DRAM), or the like.

Please note that the above embodiments are for illustrative purposes only and do not imply any limitation to the present invention.

Technical features of the above embodiments may be randomly combined. To make description concise, not all possible combinations of the technical features in the above embodiments are described. However, the combinations of these technical features shall be considered as falling within the scope recorded by this specification provided that no conflict exists.

The above embodiments only describe some implementations of this application, which are described specifically and in detail, but cannot be construed as a limitation to the patent scope of this application. It should be noted that for a person of ordinary skill in the art, transformations and improvements may be made without departing from the idea of this application. These transformations and improvements belong to the protection scope of this application. Therefore, the protection scope of the patent of this application shall be subject to the appended claims.

What is claimed is:

1. A pulse modulation control system, comprising:
a processor based on a RISC-V open-source instruction set architecture, configured to receive an operation instruction of a user, and generate a data signal based on the operation instruction; and
a pulse modulation interface module, connected to the processor and configured to receive the data signal and output a preset waveform based on the data signal;
wherein the processor comprises:
a basic instruction submodule, configured to implement a standard instruction set defined in a RISC-V standard; and
an extended instruction submodule, configured to implement a customized instruction set defined by the user;
wherein the customized instruction set comprises:
a pulse modulation control instruction, used for generating a parameter data signal for controlling a pulse modulation parameter;
wherein the pulse modulation interface module comprises sixteen pulse modulation channels, and any of the pulse modulation channels comprises:
a register group, connected to the processor and configured to receive and store the parameter data signal;
a counter, connected to the register group and configured to obtain a start signal and the data signal, start counting based on the start signal and the data signal, and generate a stage signal; and
a direction controller, connected to both the register group and the counter and configured to obtain the data signal and the stage signal, and output the preset waveform based on the data signal and the stage signal.

2. The pulse modulation control system according to claim 1, wherein the parameter data signal comprises a first parameter data signal, a second parameter data signal, a third parameter data signal, and a fourth parameter data signal;
the register group comprises:

a pulse waveform control bit, occupying one bit and configured to store the first parameter data signal;
a start phase control bit, occupying one byte and configured to store the second parameter data signal;
a duty cycle control bit, occupying one byte and configured to store the third parameter data signal; and
a waveform period control bit, occupying two bytes and configured to store the fourth parameter data signal; and
the stage signal comprises a trigger signal, a first stage control signal, and a second stage control signal, and the counter comprises:
a first counter, connected to both the start phase control bit and the direction controller and configured to obtain the start signal and a value of the second parameter data signal, start counting based on the start signal and the value of the second parameter data signal, and generate the trigger signal and the first stage control signal;
a second counter, connected to both the duty cycle control bit and the first counter and configured to obtain the trigger signal and a value of the third parameter data signal, start counting based on the trigger signal and the value of the third parameter data signal, and output the second stage control signal; and
a third counter, connected to the pulse waveform control bit and configured to obtain a value of the first parameter data signal, start timing based on the value of the first parameter data signal, and control the pulse modulation control system to stop.

3. The pulse modulation control system according to claim 2, wherein the preset waveform comprises a convex waveform and a concave waveform, and the direction controller is configured to:

obtain the first parameter data signal and the first stage control signal, and generate the convex waveform or the concave waveform based on the first parameter data signal and the first stage control signal; and
obtain the first parameter data signal and the second stage control signal, and generate the concave waveform or the convex waveform based on the first parameter data signal and the second stage control signal.

4. The pulse modulation control system according to claim 1, further comprising:
an interface controller, connected to the basic instruction submodule and configured to execute the standard instruction set; and
a first interface module, connected to the interface controller and configured to implement data transmission and control of an external device.

5. The pulse modulation control system according to claim 4, wherein the first interface module comprises at least one of a UART interface, a QSPI interface, an I2S interface, an I2C interface, a GPIO interface, and a JTAG interface.

6. A pulse modulation control device, comprising:
the pulse modulation control system according to claim 1.

7. A pulse modulation control method performed by the pulse modulation control system according to claim 1, comprising:
obtaining an operation instruction of a user;
generating, by the processor based on the RISC-V open-source instruction set architecture, a data signal based on the operation instruction; and
receiving the data signal and outputting a preset waveform based on the data signal through the pulse modulation interface module.

* * * * *